(12) United States Patent
Rovelli

(10) Patent No.: US 6,761,223 B1
(45) Date of Patent: *Jul. 13, 2004

(54) FLEXIBLE HORSESHOES FORMABLE IN SITU

(75) Inventor: Frank Rovelli, Oxnard, CA (US)

(73) Assignee: Vettec, Inc., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/329,006

(22) Filed: Dec. 23, 2002

Related U.S. Application Data (63) Continuation-in-part of application No. 09/872,575, filed on May 31, 2001, now Pat. No. 6,505,686, and a continuation-in-part of application No. 09/872,580, filed on May 31, 2001, now Pat. No. 6,497,292.
(60) Provisional application No. 60/286,832, filed on Apr. 25, 2001, and provisional application No. 60/282,338, filed on Apr. 6, 2001.

(51) Int. Cl.[7] .................................................. A01L 5/00
(52) U.S. Cl. ........................................................... 168/4
(58) Field of Search ............................. 168/4, 45, 48.1; 59/61, 56, 36; 606/212

(56) References Cited

U.S. PATENT DOCUMENTS

| | | | | |
|---|---|---|---|---|
| 4,896,727 A | * | 1/1990 | Busser | 168/4 |
| 6,009,952 A | * | 1/2000 | Porteous et al. | 168/28 |
| 6,021,851 A | * | 2/2000 | Jacobs | 168/4 |
| 6,497,292 B2 | * | 12/2002 | Rovelli | 168/4 |
| 6,505,686 B2 | * | 1/2003 | Rovelli | 168/45 |

* cited by examiner

Primary Examiner—Charles T. Jordan
Assistant Examiner—Elizabeth Shaw (57) ABSTRACT

A hoof shoe having a locus of flexing through spaced resin portions across interruptions is applied or formed in situ. The method includes cleaning the surface of the shoe area of the horse hoof of debris, applying preshaped resin portions arranged in a horseshoe pattern or depositing unshaped resin portions onto the cleaned hoof surface in the horseshoe pattern, and shaping the resin portions arranged in an intended horseshoe shape.

23 Claims, 9 Drawing Sheets

FLEXIBLE HORSESHOES FORMABLE IN SITU

CROSS-REFERENCE TO RELATED APPLICATIONS

This application is a continuation in part of U.S. patent application Ser. No. 09/872,575, filed May 31, 2001, now U.S. Pat. No. 6,505,686, issued, and is further a continuation in part of U.S. patent application Ser. No. 09/872,580, filed May 31, 2001, now U.S. Pat. No. 6,497,292, issued Dec. 24, 2002, which applications claim the benefit of U.S. Provisional Applications Serial No. 60/282,338, filed Apr. 06, 2001, and Ser. No. 60/286,832, filed Apr. 25, 2001.

STATEMENT REGARDING FEDERALLY SPONSORED RESEARCH OR DEVELOPMENT

Not applicable.

REFERENCE TO A MICROFICHE APPENDIX

Not Applicable.

BACKGROUND OF THE INVENTION

1. Field of the Invention

This invention relates to revolutionizing the art of horseshoeing. More particularly, the invention relates to forming horseshoes in place, i.e. in situ. More broadly, the invention relates to the addition to hoofs of various animals needing hoof protection. More particularly, the invention provides the benefits of shoeing to horses and other animals in an especially convenient and effective manner. The invention provides, for example, with respect to horseshoes, for the shoeing of horses with a resin composition that sets up instantly in situ on the horse's hoof in the near form of a horseshoe and is then trimmed to a perfect shape. The invention enables the periodic renewal of horseshoes with a minimum of effort, readily affords local variation in shoe thickness to compensate for hoof irregularities, and ensures an effective protection for the horse's hoof. The invention further relates to providing horseshoes that are locally flexible formed on the hoof or applied to the hoof preformed with variations in flexibility built into the shoe structure by having a locus of flexing at one or more locations as an alternative to or in alternating relation with built-up horseshoe sections. The invention further relates to providing a locus of flexing in a horseshoe and the formation of shoes having a horseshoe pattern comprising a plurality of resin portion deposits spaced from each other across an interruption between adjacent resin portions arranged in a horseshoe pattern, the several resin portions defining a reduced thickness in the horseshoe at a location where flexibility is desired. The resin portions can be formed in situ or formed in a connected relation away from the hoof, such as with additional resin portions connecting the primary resin portions as a web between relatively thicker primary resin portions, the thinner regions providing a locus of flexibility, and the thus arranged portions attached to the hoof as an integral horseshoe.

2. Description of the Related Art

Horseshoes have been fabricated of metals for centuries and more recently from synthetic materials, but always by prefabricating the shoe and then applying the prefabricated shoe onto the horse's hoof. See, for example, U.S. Pat. No. 5,699,861 to Sigafos where a kit for horseshoeing is described. The problems of prefabricated horseshoes, whether of metal or plastic is that the shape of the hoof to be shod varies making the application of a prefabricated shoe a process of trial and error, and a highly skilled and therefore expensive-to-obtain art. Also, some hoofs need a thicker section in one place than in another. It is economically infeasible to market or inventory all the possibilities that may be encountered. A number of applications for horseshoes, however, will respond to a standardized size and shape shoe, particularly where flexibility in shoe movement is desired. The present invention provides both in-situ formed and preformed shoes with flexibility features.

BRIEF SUMMARY OF THE INVENTION

What is needed is a more flexible approach, one that allows customizing of the shoes to the hoof on site without onerous or costly effort. It is accordingly an object of the invention to provide an in situ shoeing method and product. It is a further object to provide a system for the creation on the hoof itself of the shoe. It is a further object to reduce inventory requirement to merely a variously applicable resin system that is applied to the hoof in custom fashion without custom inventory. A further object of the invention is to deposit onto a prepared hoof shoeing surface an unshaped resin mass, that may comprise an intimate admixture of reactive resin components, forming the mass into in a profile approximating the intended shoe, that is malleable albeit non-flowing when applied, and modifiable to the desired exact contour to achieve any thickness, any thickness variation along the extent of the shoe, and of course a precise registration of the deposited resin system with the hoof contour without difficult bending of strong, prefabricated materials. It is a still further object to provide a mass resin system typically comprising A and B sides of a resin in the form of reactive thermosetting resin precursors, e.g. comprising urethane resin precursors, that is thixatroped to have a consistency allowing the resin during reaction to a formed, cured or hardened to a state to stand on the hoof shoeing surface without excessive flow off the surface. A further object is the provision of an animal or horse shoe of an intended profile comprising the resin mass in substantially the intended profile in situ on a horse hoof surface, more particularly a synthetic organic resin horseshoe formed in situ on a horse hoof surface, and the combination of a horse having a hoof, and a synthetic organic resin horseshoe attached to said hoof, the horseshoe having been preformed with local variations in flexibility or formed in situ from the resin mass on the horse hoof. Other objects include: forming while shoeing a moisture barrier on the hoof surface, through the adhesion of the applied resin mass to the hoof surface material; providing a repair system for shoed hooves by addition of more resin mass where wear has occurred, which is effective because the resin mass in many embodiments will adhere to its previously cured self; preventing the horse from pulling a shoe, i.e. removing a shoe on an adjacent hoof with another hoof through a purchase gained at the so-called lip protruding rearwardly from the conventional horseshoe by eliminating the lip protrusion altogether with careful tailoring of the shoe so as to be narrow on the hoof; equalizing pressure on the hoof all about the hoof surface as an improvement over the use of nails which become as many as seven or more points of pressure; enabling shoeing of horses whose hooves are worn too much to tolerate nailing, but will accept a shoe formed in situ; adding spring to the horse's step through the resiliency of the in-situ-formed horseshoe, the profile of which can be modified to add a spring function; improving traction by customizing the shoe bottom surface to the anticipated terrain; adding color at the shoe, bodily or in accents, or other optical effects including patterns and glitter to reflect the stable that trained the horse, or a cause or event; and to have or provide a layer of resiliency at the hoof for comfort and longevity of the horse.

These and other objects of the invention to become apparent hereinafter are realized in the method for building a horseshoe of an intended shape in situ, including cleaning the surface of the shoe area of horse hoof of debris, shaping a temporarily generally malleable mass of resin on the cleaned hoof surface into generally a horseshoe-shape, and locally modifying the exposed surfaces of the horseshoe mass to conform to the final intended horseshoe shape on the shoe area surface after general malleability in the resin is lost, and the horseshoe product of the method.

In this and like embodiments, typically, the resin selected is one that self-adheres to the shoe area surface, and there is included also precoating the shoe area surface under the mass with a thin layer of the mass or similar resin having less than 25% of the depth of the intended horseshoe shape, selecting as the resin a reaction product of thermosetting resin precursors, selecting as the resin precursors thermosetting urethane resin precursors.

In a further embodiment, the invention provides a method for building a horseshoe of an intended shape in situ, including cleaning the surface of the shoe area of horse hoof of debris, applying a preshaped mass of resin on the cleaned hoof surface in generally a horseshoe-shape, and precoating the surface with a resin acting to bond the shaped mass to the surface before application of the shaped mass, and the product of the method.

In this and like embodiments, typically, the method further includes locally reshaping the horseshoe mass to conform to the intended horseshoe shape on the shoe area surface, selecting as the precoating resin the same resin as the shaped mass resin.

The invention further provides in combination, the indicated preshaped mass a resin adhesive adhering the mass of resin to the surface, the resin adhesive being distributed on the surface.

In a further embodiment, the invention provides a method for building a horseshoe of an intended shape in situ, including cleaning the surface of the shoe area of a horse hoof of debris, collecting an unconfined malleable resin mass beyond the shoe area surface, applying the mass onto the cleaned hoof surface in a generally horseshoe-shaped form, and then locally modifying the exposed surfaces of the horseshoe mass to conform to the final intended horseshoe shape on the shoe area surface.

In this and like embodiments, typically, the method further includes selecting as the resin mass a mass that self-adheres to the shoe area surface, and selecting as the resin mass a mass comprising a mixture of thermosetting resin precursors, such as thermosetting urethane resin precursors.

In a further embodiment, the invention provides a method for building an animal shoe of an intended shape in situ, including cleaning the surface of the shoe area of debris, depositing onto the cleaned hoof surface a flowable shoe preform comprising a resin mass having a depth and width of profile generally conforming to the intended shoe shape in the shoe area surface adhering relation, reducing the mass to a non-flowable state to retain substantially all the mixture on the shoe area surface, and then locally mechanically modifying the mass to modify its profile to conform to the final intended shoe shape on the shoe area surface.

As in previous embodiments, in this and like embodiments, typically, the method includes selecting as the mass a mass that self-adheres to the shoe area surface, selecting as the mass a mass that comprises reactive resin precursors in intimate admixture in a common vessel, the mass being reduced to a nonflowable state by reaction of the precursors, such as thermosetting resin precursors, e.g. thermosetting urethane resin precursors such as diphenylmethane diisocyanate, polyol, a thixatroping amine, such as a thixatroping primary or secondary amine, like meta xylene diamine.

The invention further includes the products of the foregoing methods.

In a further embodiment, there is provided a method for building a horseshoe in situ including cleaning the surface of the shoe area of horse hoof of debris, depositing onto the cleaned hoof surface a flowable horseshoe perform comprising an intimate curable mixture of urethane resin precursors comprising diphenylmethane diisocyanate and a polyoxyproplyene oxide polyol and meta xylene diamine at a depth and width profile greater than the intended horseshoe shape at a viscosity to remain on the surface, curing the mixture to a non-flowable mass in less than one minute, and shaping the horseshoe preform to reduce its profile to a final intended horseshoe shape on the surface, and the product thereof.

Other products of the invention include a horseshoe of an intended profile, the horseshoe comprising a resin mass formed in substantially the intended profile in situ on a horse hoof surface, suitably formed of a synthetic organic resin, the combination of a horse having a hoof, and a synthetic organic resin horseshoe attached to the hoof, the horseshoe having been formed in situ on the horse hoof, and the combination of: a horse having a hoof, and a synthetic organic resin horseshoe attached to the hoof, the horseshoe having been formed in situ on the horse hoof from a resin mass deposited on the hoof at a depth and width profile approximating the intended horseshoe shape.

In a further aspect, the invention provides a method of building a horseshoe of an intended shape in situ, including cleaning the surface of the shoe area of horse hoof of debris, applying a non-shoe shaped formless mass of resin to the cleaned shoe area surface as a series of spaced individual resin portions arranged as an interrupted shoe-shape, hardening the resin portions in place, and locally modifying the exposed surfaces of the deposits to conform to the final intended horseshoe shape.

The invention further provides a method of building a flexible horseshoe for attachment to a hoof surface, the horseshoe having a locus of flexing, including cleaning the surface of the shoe area of horse hoof of debris, arranging successive non-shoe shaped formless resin portions as a series of spaced individual resin portions arranged as a shoe-shape with interruptions between adjacent resin portions, the shoe shape having a locus of flexing at one or more of said interruptions, hardening said resin portions, locally modifying the exposed surfaces of said portions to conform to a horseshoe shape, and attaching said horseshoe shape to said hoof.

In these and like embodiments, typically, the deposits each have an individual given vertical extent, and there is included also connecting adjacent ones of the deposits with additional resin portions of lesser vertical extent than the given vertical extents of the adjacent deposits, selecting as the resin one that self-adheres to the shoe area surface, precoating the shoe area surface under the shapeable mass with a thin layer of the mass having less than 25% of the depth of the intended horseshoe shape, selecting as the resin a reaction product of thermosetting resin precursors, and selecting as the resin precursors thermosetting urethane resin precursors.

In its product aspects, the invention provides the products of the foregoing methods, and a flexible horseshoe having a locus of flexing, the horseshoe comprising a generally horseshoe-shaped series of resin portions deposited onto a horse shoe area and hardened in situ, the resin portions being spaced from each other across intervening interruptions, at least one of the interruptions defining a locus of flexing in the horseshoe.

In these and like embodiments, typically, the deposited resin portions each have an individual given vertical extent, and there is included also connected adjacent ones of the deposits with additional resin portions of lesser vertical extent than the given vertical extents of the adjacent deposits.

In a further embodiment there is provided a flexible horseshoe having a locus of flexing, the horseshoe comprising a generally horseshoe-shaped series of interconnected resin portions fixed onto a horse shoe area, the resin portions being spaced from each other across intervening interruptions, at least one of the interruptions defining a locus of flexing in the horseshoe.

Typically, in this and like embodiments, the locus of flexing is transverse to the longitudinal axis of the horseshoe and located within the front, rear or between the front and rear thirds of the horseshoe, or in the rear third of the horseshoe and generally parallel with the longitudinal axis of the horseshoe.

The invention thus provides a horseshoe of an intended profile, the horseshoe comprising a resin mass formed from an unshaped mass into substantially the intended profile in situ on a horse hoof surface, a synthetic organic resin horseshoe from an unshaped resin mass in situ on a horse hoof surface, the combination of a horse having a hoof, and a synthetic organic resin horseshoe attached to the hoof, the horseshoe having been formed from an unshaped resin mass in situ on the horse hoof, the combination of a horse having a hoof, and a synthetic organic resin horseshoe attached to the hoof, the horseshoe having been formed in situ on the horse hoof from an unshaped resin mass deposited on the hoof at a depth and width profile approximating the intended horseshoe shape. The present hoofs can comprises synthetic organic resin hardened in situ on a hoof, wherein the resin exhibits an optical effect other than its natural appearance.

Still further, the invention provides a method of protecting a horse hoof from moisture accumulation between shoe and hoof, including cleaning the hoof surface of debris and forming on the cleaned hoof a horseshoe from an unshaped adherent resin mass that adheres to the hoof surface in moisture excluding relation, a method of protecting a horse hoof from uneven pressure on the hoof from horseshoe, including clearing from the hoof all nails and previous shoe, and forming on the cleaned hoof a horseshoe from an unshaped adherent resin mass that adheres to the hoof surface in shoe-forming relation, a method of maintaining a horse hoof shoe against wearing from an intended shape, including cleaning the shoe surface of debris, and restoring the intended shape to the shoe through the added application of an adherent resin mass, and a method of increasing the stepping comfort of a horse, including providing and maintaining as the horse hoof shoe a shoe comprising a resin having a resilience to be reduced temporarily in vertical profile when the horse puts its weight upon the shoe.

BRIEF DESCRIPTION OF THE SEVERAL VIEWS OF THE DRAWINGS

The invention will be further described in conjunction with the attached drawings in which.

DETAILED DESCRIPTION OF THE INVENTION

The invention provides the ultimate in flexible shoeing convenience. A resin mass that is malleable, that is shapeable by pushing with a hand held spatula, but so viscous as to stand, at least temporarily, as deposited and not flow freely from the hoof surface, is deposited as an unshaped mass by trowel, dual cartridge dispenser gun, by hand or other means from a mixing vessel such as a bucket or the cartridges onto the shoeing area of the hoof. The mass is deposited as a series of resin portions in approximately the intended shoe shape and when solidified by solvent evaporation, cure, setting up, or hardening from a more fluid state to be nonmalleable or rigid each deposit of a resin portion is trimmed to the intended shoe shape. The use of an in situ formed shoe eliminates the need for an inventory of various shoes, and the need for the farrier's laborious fashioning of metal to just the right form. If the hoof is less than perfect, or the horse in need of a particular kind of shoe, the amount and disposition of the resin mass can be tailored by a simple adjustment in the application steps to compensate. The invention enables the customizing of the shoe to the horse in a remarkably easy manner. The spacing of the successive resin portions allows the building in of a locus of flexibility between successive resin portions at the interruptions in the shoe shape.

Figures 1, 1A:
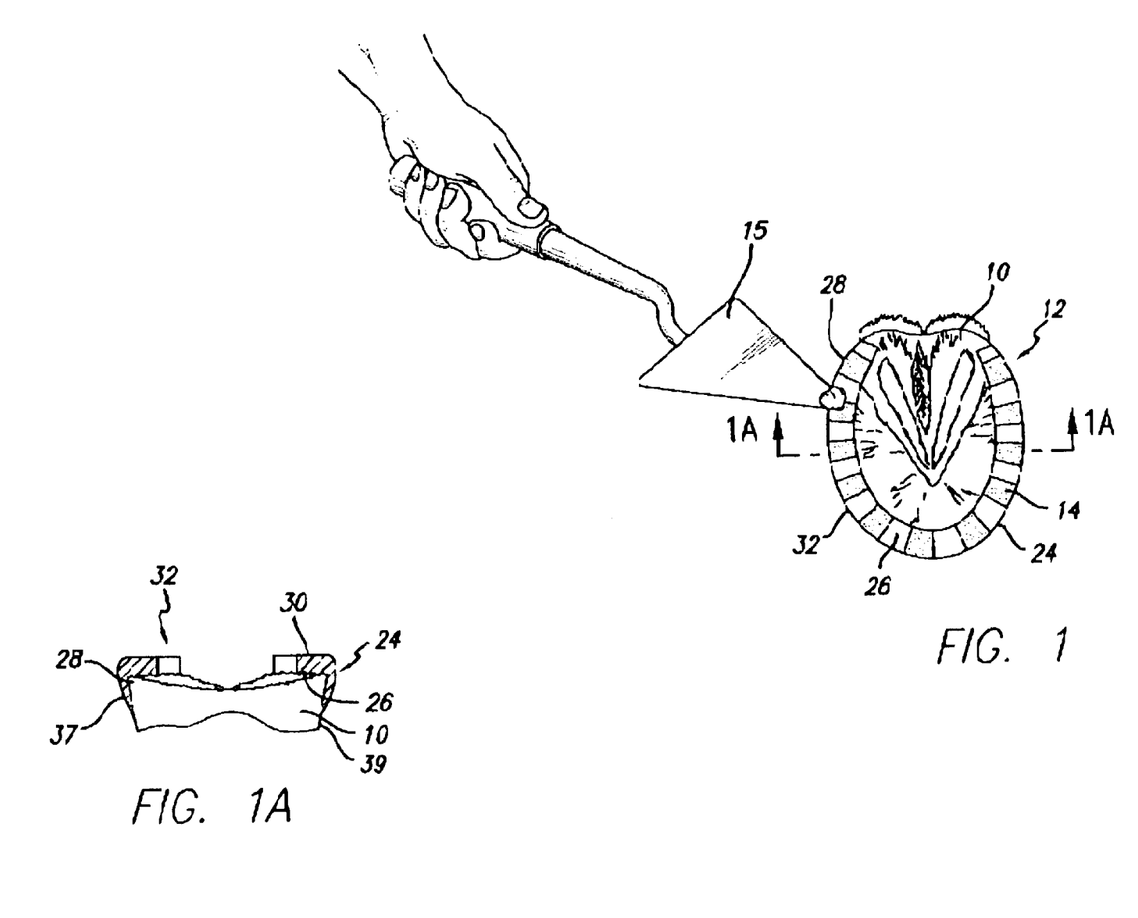
FIG. 1 is an oblique view of the troweling application of a series of distributed portions of an unshaped, malleable resin mass arranged in generally a horseshoe pattern and spaced by intervening interruptions to provide a segmented horseshoe formed in situ on a hoof surface and having a local region of flexibility between successive portions to enable shoe conformance to hoof surface movements.
FIG. 1A is taken on line 1A—1A in FIG. 1.

With reference now to the drawings in detail in FIGS. 1 and 1A, hoof 10 has a surface 26 defining a shoe area 28.

Shoe area 28 is provided with a shoe 12 formed immediately on the hoof, i.e. in situ, from a succession of deposited resin portions 14 of from resin mass 14 a deposited from a spatula or trowel 15 onto the shoe area 28.

The invention method for building in situ a horseshoe 12 of an intended shape 24 (shown in FIGS. 2 and 3), includes upturning the horse hoof 10 for treatment, and cleaning the surface 26 of the shoe area 28 of horse hoof of debris. An interrupted shoe preform 32 is formed on the shoe area 28 by depositing onto the surface 26 a succession of unshaped resin portions 14; these portions are then shaped with a suitable tool into generally an interrupted shoe shape (preform 32) having a suitable depth, e.g. ½ inch high, ½ to 1 inch or more long along the front to rear extent of the hoof, and of suitable width (across the hoof to which the resin portion is applied), e.g. 1 inch, of profile 30, see FIG. 1A. Preform profile 30 generally conforms to the intended horseshoe shape 24. Suitably, the mass 14 self-adheres, as with a urethane resin, or is made to adhere through the use of adhesives, to the shoe area surface 26. The mass 14 loses malleability through loss of solvent, cooling in the case of a hot melt resin mass, curing or hardening under any of various regimes including cure by moisture, heat, light, catalysts, etc., suitably at ambient temperatures, preferably of 65 to 85 degrees ° F. for the thermosetting resin system exemplified below. Resin portions 14 having the profile 30 of the preform 32 can harden or cure to a non-malleable form 36 by the just mentioned processes or by reaction of the resin precursors before substantial portions of the mass 14 flow from the profile 30 shape. In some cases the portion 14 is deliberately extended at 36 as a skirt 37 to cover the immediately adjacent hoof areas 39 beyond the hoof surface 26.

Figure 2:
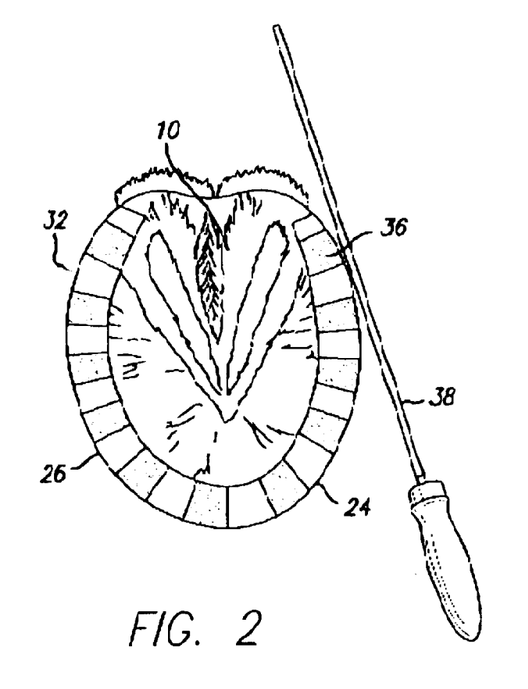
FIG. 2 is a plan view of the cured hoof shoe portions being modified to the shoe's intended shape.
Figure 3:
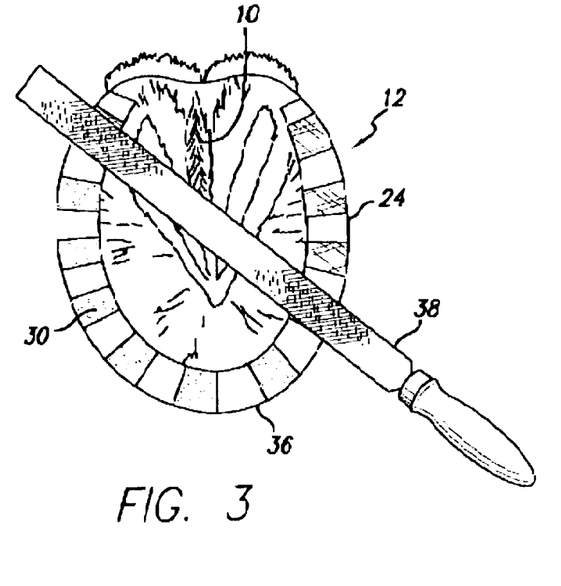
FIG. 3 is a view like FIG. 2 showing further modification of the hoof shoe portions.

Following loss of malleability, which is accomplished in one or two minutes, or faster, such as 30 seconds, the constituent parts of the preform 32, the resin portions 14, are locally shaped with a rasp 38 or other tool to have the intended shoe shape 24 with the surface finish and perimeter contour desired, see FIGS. 2 and 3.

Epoxy, vinyl ester, acrylic, polyester, and other resins formulations that set up or cure quickly without animal damaging exotherms, that are tough, that are hoof adherent or adherable to the hoof through intermediary adhesives, and are otherwise suitable are likely candidates for use in the invention, in addition to the urethane resins mentioned herein. Suitable resin systems herein are resins having the requisite strength and forming properties and include, among thermosetting resins, epoxy resins, vinyl ester resins, such as the auto-cure or light-cure resin products of diacrylates, and dimethacrylates of Bisphenol-A ethoxylate resins, corresponding bis-F resins, the auto-cure or light-cure resin products of acrylic functionality, unsaturated polyester resin oligomers, including those based on the condensation products of maleic and phthalic anhydrides or acids of glycols, polyester resins in combinations of monomers including styrene, divinylbenzene, ethyl acrylate, methylmethacrylate, and other acrylates, and auto-curing resins above that are catalyzed by various peroxides and promoted by various amines. Thermoplastics such as polyamides, acrylonitrile butadiene styrene polymers, polycarbonates, polyphenylene oxides, polysulfones, polyphenylene sulfides, and fluoropolymers can be used where the strength and other properties are adequate to horseshoe use.

Preferred are polyurethane polymers, thermosetting synthetic organic resins formed from A and B sides comprising reactive component precursors of the resin. Such resins cure rapidly, are low in shrinkage, are hard and tough, are formable with tools such as rasps in less than two minutes, preferably, do not have excessive exotherms that might injure or discomfort the animal, and self-adhere to the surface 26. Preferably, these resins are reaction products of reactive precursors that can be mixed simply as reactive resin precursors to an intimate admixture. Preferred urethane resins are formed from reactive precursors of diisocyanates, e.g. aliphatic, and preferably aromatic diisocyanates, on one side and polyols, either aliphatic or aromatic polyols, on the other, with other additives that act as coupling agents, such as silanes in amounts from 0.1 to 5% by weight, that extend the polymer chains, add thixatropy, such as amines, and/or fumed silicas, that catalyze the reaction. Preferred urethane resins include thixatropic compositions having the side A reactive resin precursor diphenylmethane diisocyanate and as the side B reactive resin precursor polyoxypropylene oxide polyether polyols and meta xylene diamine, a coupling agent such as one or more silanes at about 3% by weight of the reaction mixture, Quadrol, for improved snap and rasping qualities, and thixatroping agents.

Figure 10:
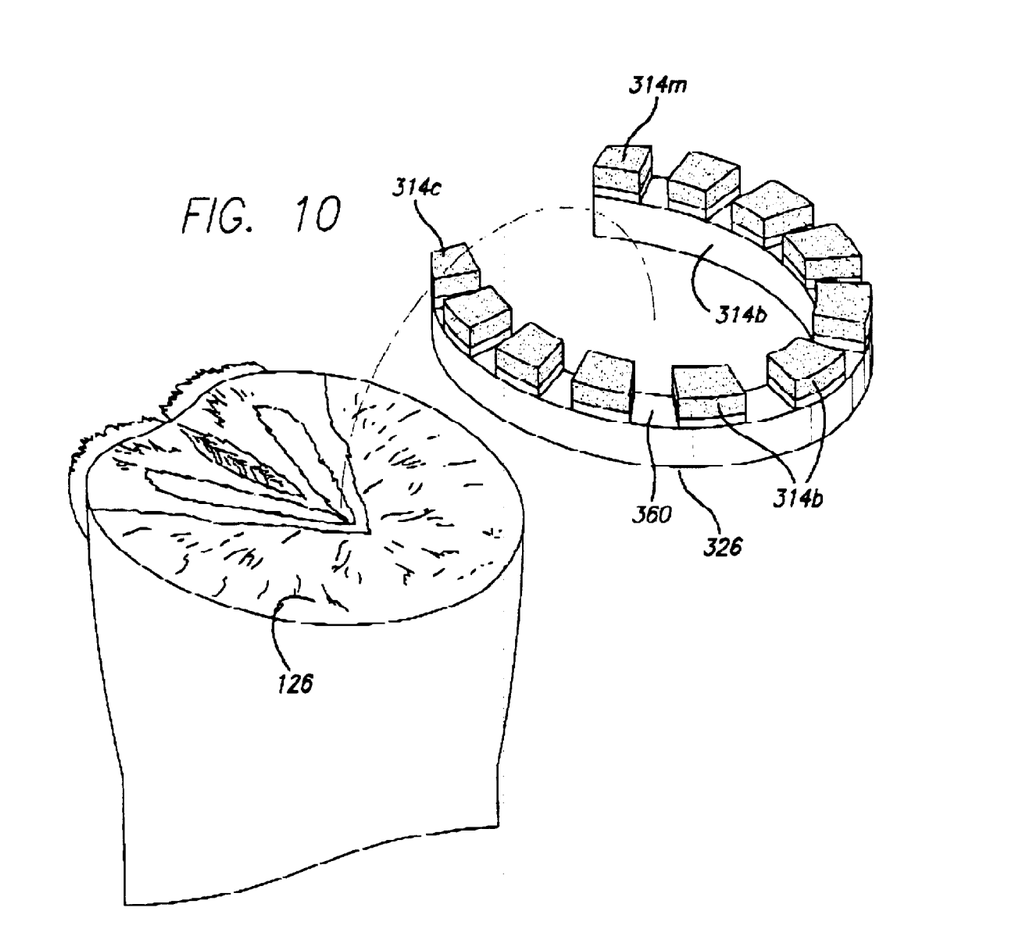
FIGS. 10 to 13 are oblique views of horse shoes having deposit patterns like FIGS. 6–9 preconnected to each other by thin resin mass portions between deposits before application to the horse hoof.
Figure 11:
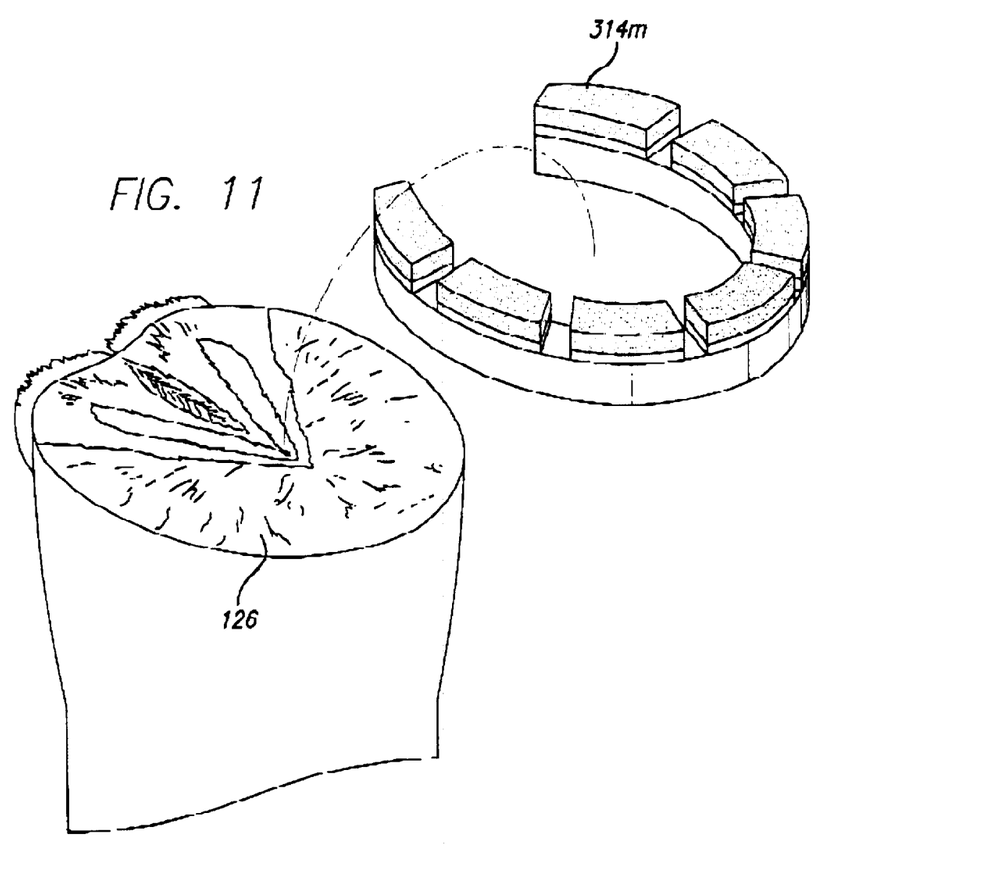
Figure 12:
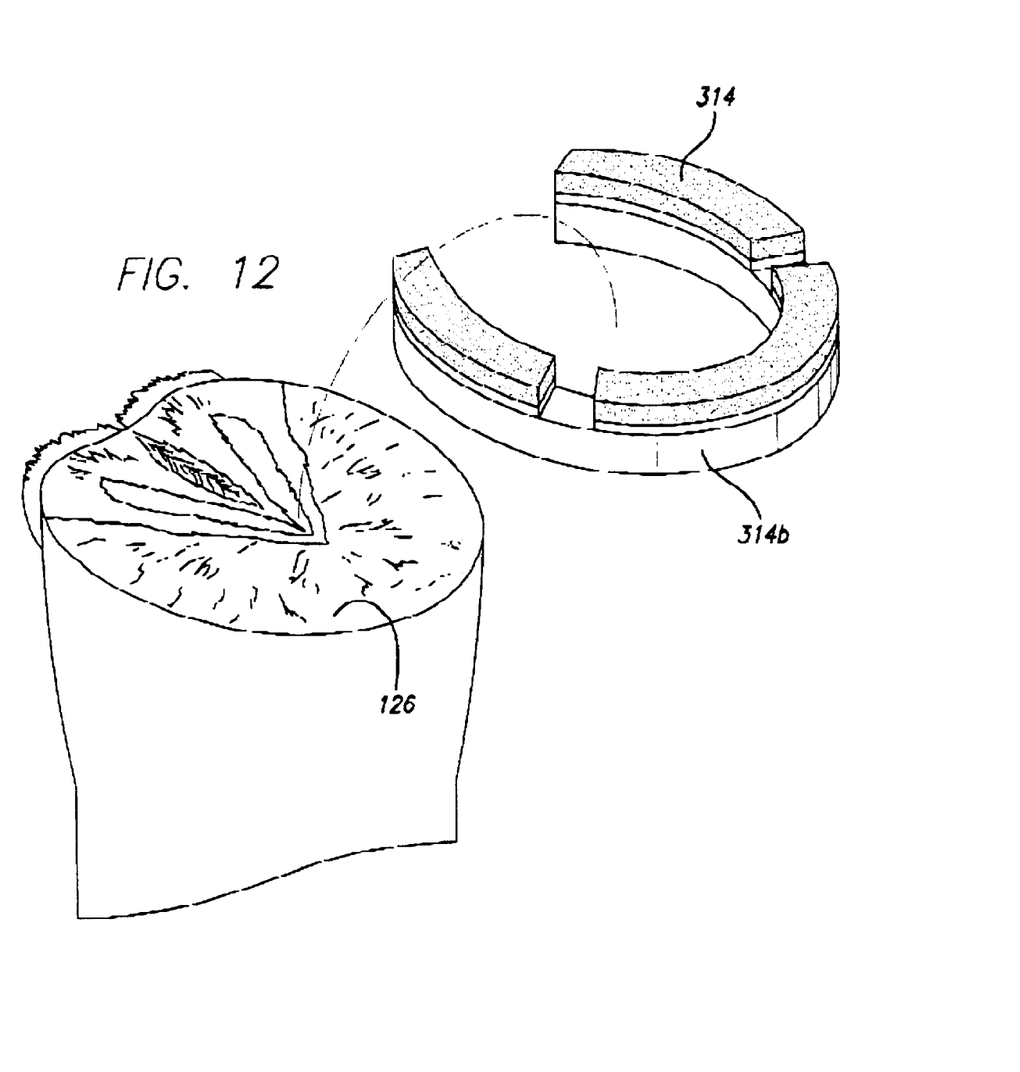
Figure 13:
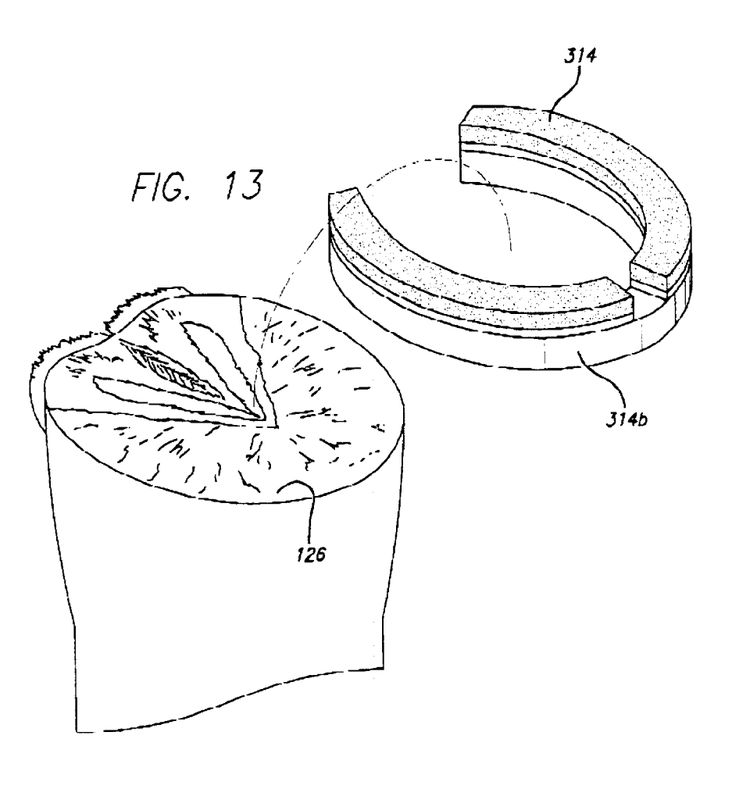

If desired, there can be a precoating of the shoe area surface with a thin layer 14b of the resin mass 14a, typically having less than 25% and as little as 5 to 15% of the profile 30 depth of the intended horseshoe shape 24. Such a lesser mass of reactants will have a lower exotherm than the full profile depth, assuming the same reactants. The thin layer 14b is typically at least partially cured before depositing additional mass 14a onto the thin layer. The layer 14b can be increased in thickness as shown in FIG. 10, to support the resin portions 14, as hereinafter described.

Further details on suitable urethane resins prepared from one or more isocyanates, catalysts, various polyols, and amines are disclosed in U.S. Pat. No. 4,869,400, the disclosure of which is hereby incorporated herein, provided the foregoing criteria are met.

Figures 4, 4A:
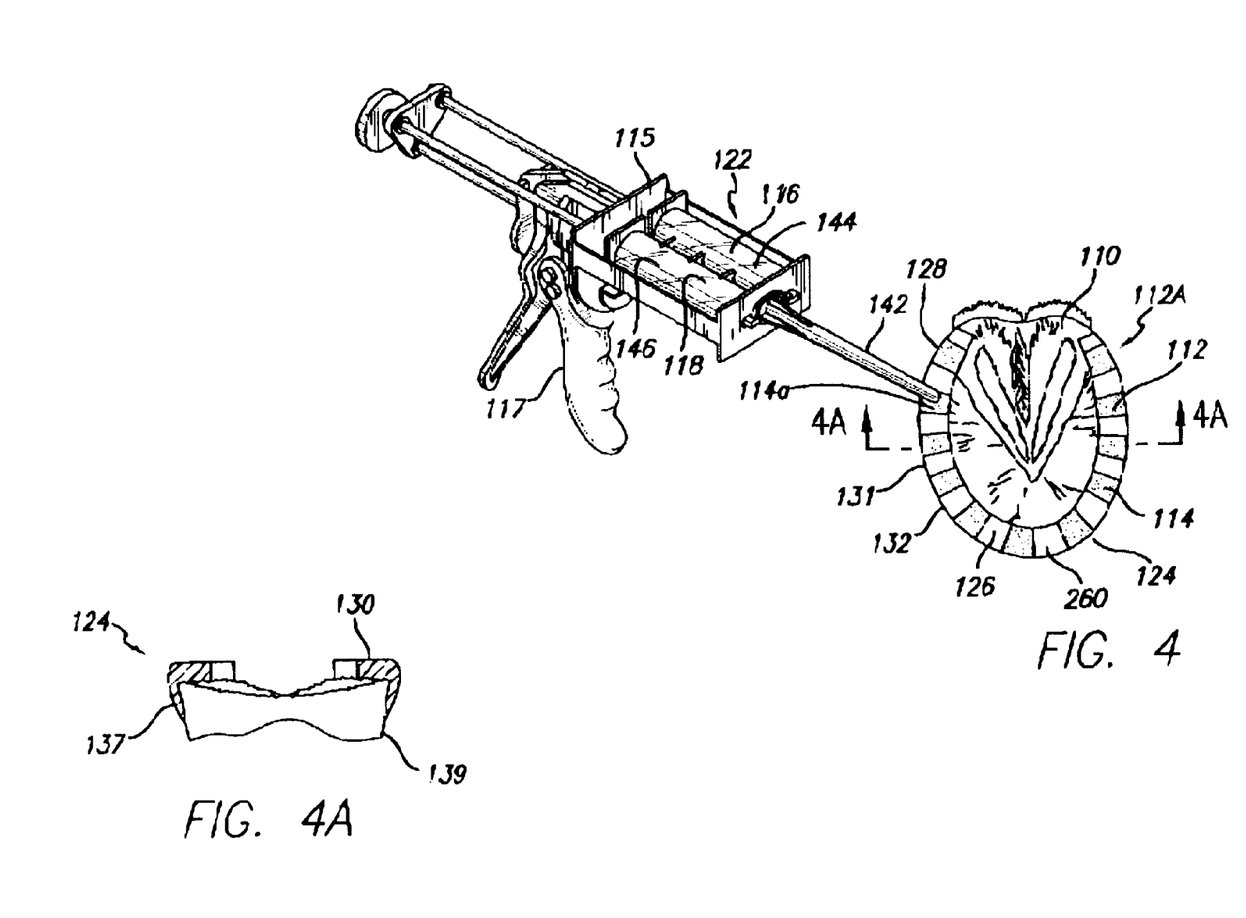
FIG. 4 is an oblique view of the extrusion application of flowable curable resin mixture deposits onto a hoof surface from an applicator gun.
FIG. 4A is taken on line 4A—4A in FIG. 1.

With further reference to the drawing in FIGS. 4 and 4A, hoof 110 has a surface 126 defining a shoe area 128. Shoe area 128 is provided with a shoe 112 formed immediately on the hoof, i.e. in situ, from a mixture 114 of reactive resin components delivered from dual chambers 116, 118 of dispenser 122 carried in applicator 115 that delivers the mixture by pumping the hand grip 117.

Figures 5, 5A:
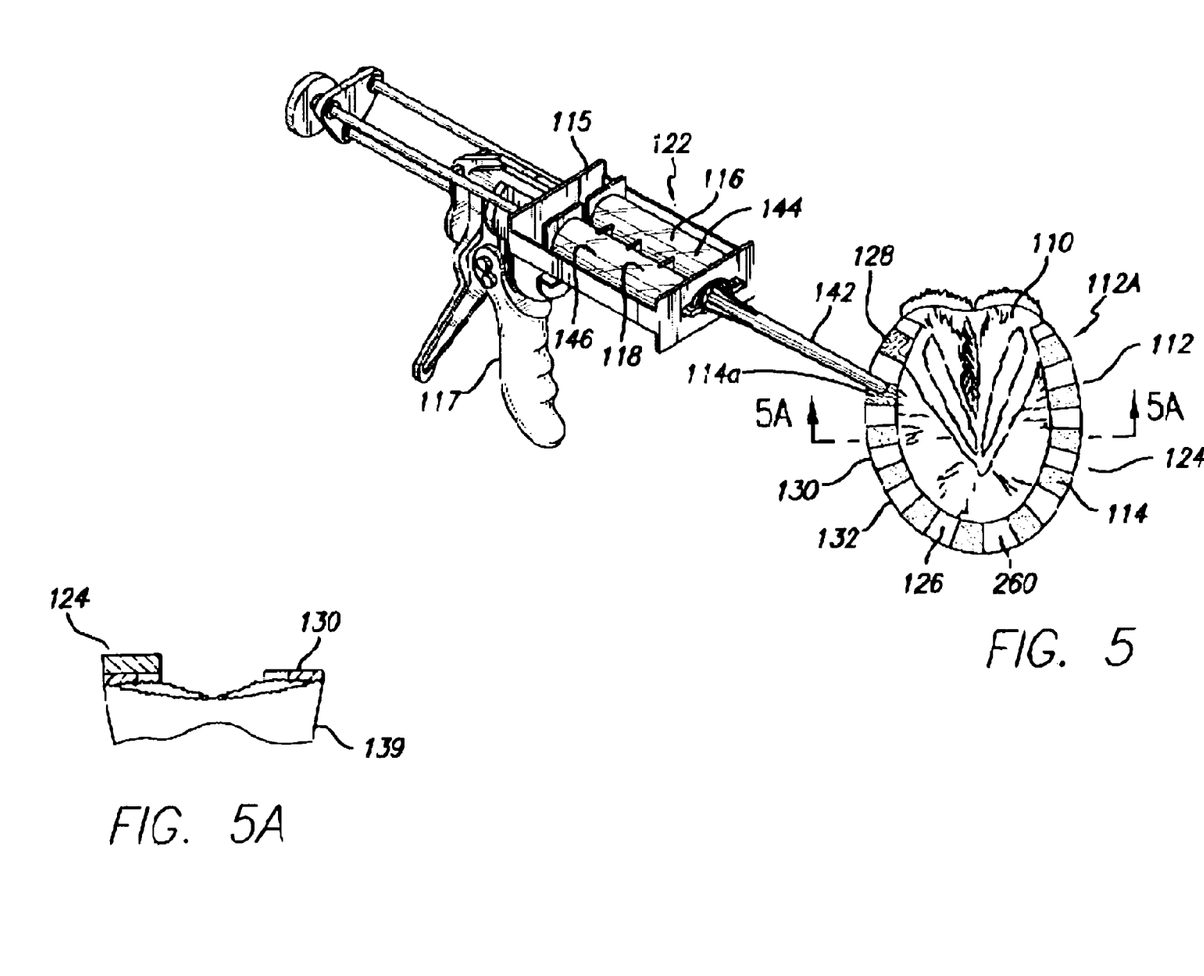
FIG. 5 is a view like FIG. 4 of the application of a precoating of resin in advance of a full profile application.
FIG. 5A is taken on line 5A—5A in FIG. 5.

The invention method for building in situ a horseshoe 112 of an intended shape 124 (shown in FIG. 5), includes upturning the horse hoof 110 for treatment, and cleaning the surface 126 of the shoe area 128 of horse hoof of debris. A shoe preform 132 is formed on the shoe area 128 by depositing onto the surface 126 as a succession of resin portions 114, discrete and unconnected except as noted below, a flowable intimate curable mixture 114a of reactive resin precursors having a suitable depth, e.g. ½ inch, length, and width, as earlier described e.g. 1 inch, of profile 130, see FIG. 4A.

Using either a six ounce size cartridge or a three ounce or other size cartridge the reactive precursor mixture 114a is suitably extruded onto the cleaned hoof surface area 126 from a common mix tip 142 comprising extended flights of mix elements as is known and communicating with separate reactive resin precursors 144, 146 in first and second chambers 116, 118 of the dispenser 122. The individual resin portions, alone or with added connector portions 114b define the flowable horseshoe preform 132 extruded as an intimate, curable mixture of the reactive resin precursors 144, 146 at the above-noted profile 30 depth and width and generally conforming to the intended interrupted horseshoe shape 124.

The user locally shapes the horseshoe mass to modify its extruded profile to the final intended interrupted horseshoe shape 124 on the surface 126.

Suitably, the mixture portions 114 self-adhere, as with a urethane resin, or are made to adhere, to the shoe area surface 126. The mixture deposits of resin portions 114 cure in place under any of various cure regimes noted in connection with FIGS. 1–3. Portions 114 having the interrupted profile 130 of the preform 132 cure to a non-flowable state by reaction of the resin precursors before the portions substantially flow from the shoe area surface 126. In some cases the portions 114 are deliberately extended as a skirt 137 to cover the immediately adjacent hoof areas 139 beyond the hoof surface 126.

As before, following cure, which is accomplished in one or two minutes, or faster, such as 30 seconds, the resin portions 114 are locally shaped with a rasp 138 or other tool to have the intended interrupted shoe shape 124 with the surface finish and perimeter contour desired.

Figures 6, 7, 8, 9:
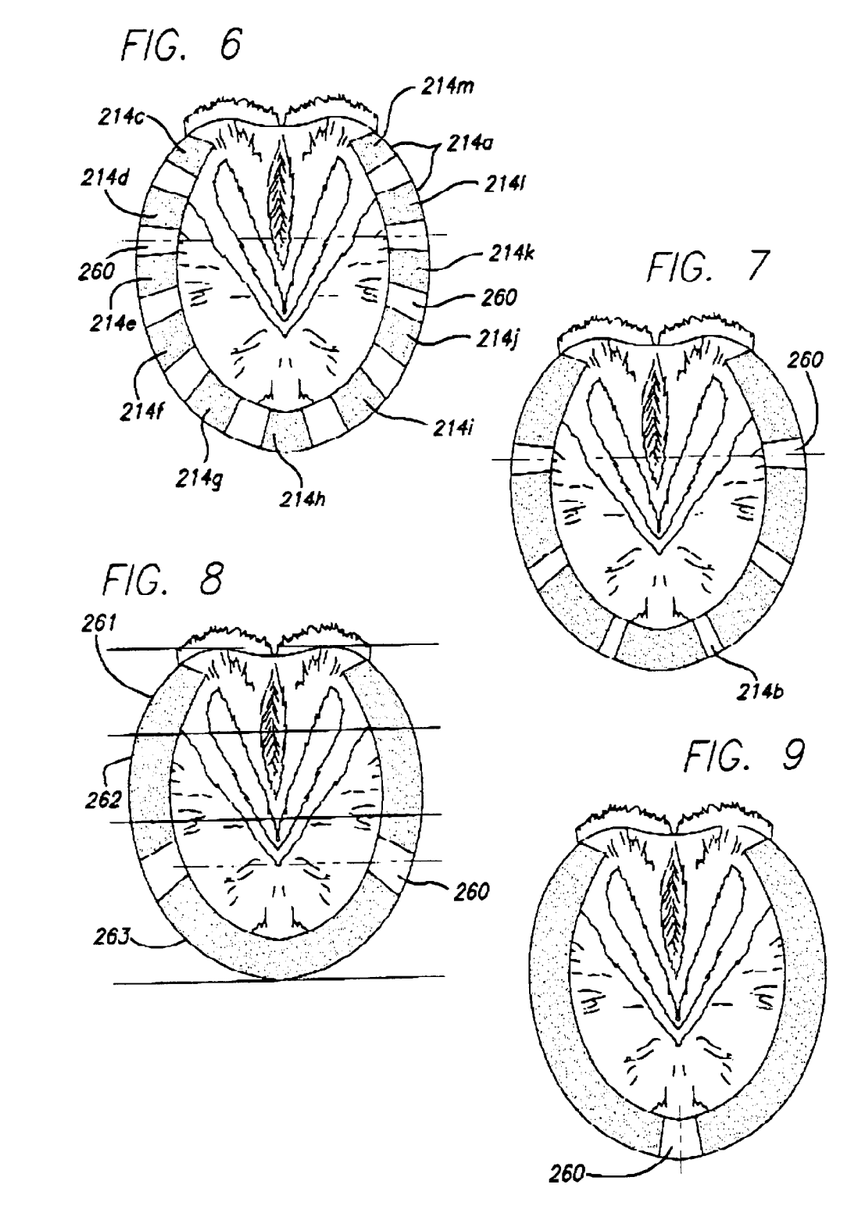
FIG. 6 is a bottom plan view of one type of deposit pattern for a horse shoe having a locus of flexing according to the invention.
FIG. 7 is a view like FIG. 6 of a further type of deposit pattern for a horse shoe having a locus of flexing according to the invention.
FIG. 8 is a view like FIG. 6 of a further type of deposit pattern for a horse shoe having a locus of flexing according to the invention.
FIG. 9 is a view like FIG. 6 of a further type of deposit pattern for a horse shoe having a locus of flexing according to the invention.

With reference to FIGS. 6–13, the resin mass 214a is formed into a series of spaced individual resin portions 214c, 214d, etc., through 214m arranged as an interrupted shoe-shape, as shown. The arrangement of resin portions 214c–214m is generally symmetrical but not necessarily. In FIG. 6, eleven resin portions 214c–m are shown; in FIG. 7, seven, in FIG. 8, three, and in FIG. 9 two. These depictions are merely illustrative.

The interruptions 260 between successive resin portions, e.g. between portions 214d and 214e in FIG. 6 serve to define there a locus of flexing, noted by the dotted line, owing to the reduced or omitted presence of connector resin mass 214b. The flexibility thus provided by the interrupted horseshoe design allows the hoof to flex rather than to be constrained by the shoe. Other patterns of interruptions 260 shown by dotted lines in FIGS. 7 through 9, provide other placements of a locus of flexing, to be in the front, middle or rear third of the horseshoe 261, 262 or 263.

With reference to FIGS. 10–13, the invention building of a flexible horseshoe shape 324 for attachment to a hoof surface 326 is shown, including arranging successive non-shoe shaped formless resin portions 314 as a series of spaced individual resin portions arranged as the shoe-shape with interruptions 360 between adjacent resin portions, the shoe shape having a locus of flexing, dotted lines, at one or more of the interruptions.

In the FIGS. 10–13 embodiments, the deposited resin portions 314 each have an individual given vertical extent, as shown, and additional resin portions 314b connect adjacent ones of the deposits with lesser a lesser vertical extent, as shown (the additional resin portion thickness is exaggerated for clarity and is typically only enough to support the portions 314, or from 1/16 to 1/4 inch).

EXAMPLE

A reactive urethane resin mixture typically useful in the invention is prepared from two parts (A and B sides) of equal volume in a suitable vessel such as a bucket, or in a dual cartridge dispenser in which dual pistons on a common yoke extrude the separate reactive components through a manifold and into a mix tip comprising a series of baffles arranged to cut and recombine the mixing materials as they progress through the mix tip. All parts and percentages are by weight:

| Component | Percent |
|---|---|
| Part A | |
| Isocyanate Prepolymer (Rubinate 1660 or MDI) | 78. |
| D.B. Castor Oil | 21. |
| Silane (Silquest A-1310) | 1. |
| Silane A-187 | 2. |
| Part B | |
| Polyol (Multranol 3901) | 54. |
| Polyol (Multranol 4012 | 26. |
| Quadrol (N'N'N'N'-tetrakis(2-hydroxyethyl or propyl ethylene diamine) | 18. |
| MXDA (1,3-benzene diamino methane) | 2.6 |
| Catalyst (Coscat 83) | 0.25 |

The reaction mass comprising the above sides mixed together is applied by onto the horse hoof that has been cleaned and otherwise prepared to receive the in-situ or shaped horseshoe having the noted pattern of resin portions and alternating interruptions.

The invention thus provides a method for building a horseshoe of an intended shape in situ or apart from the horse hoof, using a resin mass to deposit discrete, unshaped portions of resin as the horseshoe preform, the mass having a depth and width of profile generally conforming to the intended interrupted horseshoe shape, adhering the mixture to the shoe area surface, rendering the mass nonmalleable before substantial portions of the mixture flows from the shoe area surface, and then locally shaping the horseshoe preform to modify its deposited profile to conform to the final intended horseshoe shape on the shoe area surface.

The foregoing objects are thus met.

I claim:

1. A method of building a horseshoe of an intended shape in situ, including cleaning the surface of the shoe area of horse hoof of debris, applying a non-shoe shaped formless mass of resin to the cleaned shoe area surface as a series of spaced individual resin portions arranged as an interrupted shoe-shape, hardening said resin portions in place, and locally modifying the exposed surfaces of said deposits to conform to said final intended horseshoe shape.

2. The method according to claim 1, in which said deposits each have an individual given vertical extent, and including also connecting adjacent ones of said deposits with additional resin portions of lesser vertical extent than said given vertical extents of said adjacent deposits.

3. The method according to claim 1, including also selecting as said resin one that self-adheres to said shoe area surface.

4. The method according to claim 1, including also precoating said shoe area surface under said shapeable mass with a thin layer of said mass having less than 25% of the depth of said intended horseshoe shape.

5. The method according to claim 1, including also selecting as said resin a reaction product of thermosetting resin precursors.

6. The method according to claim 1, including also selecting as said resin precursors thermosetting urethane resin precursors.

7. The horseshoe produced by the method of claim 1.

8. A method of building a flexible horseshoe for attachment to a hoof surface, said horseshoe having a locus of flexing, including cleaning the surface of the shoe area of horse hoof of debris, arranging successive non-shoe shaped formless resin portions as a series of spaced individual resin portions arranged as a shoe-shape with interruptions between adjacent resin portions, said shoe shape having a locus of flexing at one or more of said interruptions, hardening said resin portions, locally modifying the exposed surfaces of said portions to conform to a horseshoe shape, and attaching said horseshoe shape to said hoof.

9. The method according to claim 8, in which said deposits each have an individual given vertical extent, and including also connecting adjacent ones of said deposits with additional resin portions of lesser vertical extent than said given vertical extents of said adjacent deposits.

10. A flexible horseshoe having a locus of flexing, said horseshoe comprising a generally horseshoe-shaped series of resin portions deposited onto a horse shoe area and hardened in situ, said resin portions being spaced from each other across intervening interruptions, at least one of said interruptions defining a locus of flexing in said horseshoe.

11. The horseshoe according to claim 10, in which said deposited resin portions each have an individual given vertical extent, and including also connecting adjacent ones of said deposits with additional resin portions of lesser vertical extent than said given vertical extents of said adjacent deposits.

12. A flexible horseshoe having a locus of flexing, said horseshoe comprising a generally horseshoe-shaped series of interconnected resin portions fixed onto a horse shoe area, said resin portions being spaced from each other across intervening interruptions, at least one of said interruptions defining a locus of flexing in said horseshoe.

13. The flexible horseshoe according to claim 12, in which said locus of flexing is transverse to the longitudinal axis of said horseshoe and located within the front third of said horseshoe.

14. The flexible horseshoe according to claim 12, in which said locus of flexing is located within the rear third of said horseshoe.

15. The flexible horseshoe according to claim 14, in which said locus of flexing is transverse to the longitudinal axis of said horseshoe and located within the rear third of said horseshoe.

16. The flexible horseshoe according to claim 14, in which said locus of flexing is generally parallel with the longitudinal axis of said horseshoe.

17. The flexible horseshoe according to claim 12, in which said locus of flexing is transverse to the longitudinal axis of said horseshoe and located between the front and rear thirds of said horseshoe.

18. A horseshoe of an intended profile, said horseshoe comprising a resin mass formed from an unshaped mass into substantially said intended profile in situ on a horse hoof surface.

19. A synthetic organic resin horseshoe from an unshaped resin mass in situ on a horse hoof surface.

20. In combination: a horse having a hoof, and a synthetic organic resin horseshoe attached to said hoof, said horseshoe having been formed from an unshaped resin mass in situ on said horse hoof.

21. In combination: a horse having a hoof, and a synthetic organic resin horseshoe attached to said hoof, said horseshoe having been formed in situ on said horse hoof from an unshaped resin mass deposited on said hoof at a depth and width profile approximating the intended horseshoe shape.

22. A method of protecting a horse hoof from moisture accumulation between shoe and hoof, including cleaning the hoof surface of debris and forming on the cleaned hoof a horseshoe from an unshaped adherent resin mass that adheres to the hoof surface in moisture excluding relation.

23. A method of increasing the stepping comfort of a horse, including providing and maintaining as the horse hoof shoe a shoe comprising a resin having a resilience to be reduced temporarily in vertical profile when the horse puts its weight upon the shoe.

* * * * *